United States Patent [19]

Records et al.

[11] Patent Number: 4,886,156
[45] Date of Patent: Dec. 12, 1989

[54] LOG CONVEYOR SYSTEM

[75] Inventors: Robert A. Records, Newberg; Ralph E. Luchterhand, Portland; John F. Detroit, Newberg, all of Oreg.

[73] Assignee: U.S. Natural Resources, Log Boss Systems Division, Portland, Oreg.

[21] Appl. No.: 144,757

[22] Filed: Jan. 19, 1988

Related U.S. Application Data

[63] Continuation of Ser. No. 725,303, Apr. 19, 1985, abandoned.

[51] Int. Cl.[4] .............................................. B65G 15/44
[52] U.S. Cl. ..................................... 198/692; 198/841; 198/850; 144/242 D; 474/207
[58] Field of Search ............... 198/692, 693, 840, 841, 198/850, 729, 730, 733, 734; 474/140, 206, 207; 144/242 D, 245 A, 245 D

[56] References Cited

U.S. PATENT DOCUMENTS

| | | | |
|---|---|---|---|
| 801,699 | 10/1905 | Wells | 198/692 |
| 2,653,808 | 9/1953 | Simmons | 474/206 |
| 2,910,170 | 10/1959 | Dodson | 198/692 |
| 3,198,319 | 8/1965 | Blume . | |
| 3,858,713 | 1/1975 | Allen . | |
| 3,885,837 | 5/1975 | Mellor . | |
| 4,008,801 | 2/1977 | Reilly et al. . | |
| 4,215,776 | 8/1980 | Esler . | |

FOREIGN PATENT DOCUMENTS 1168182  5/1984  Canada ................................ 198/692

OTHER PUBLICATIONS

*Timber Processing Ind.*, Oct. 1984, p. 14 (advertisement).
H. Jack Flanders Co., Inc. (brochure).

Primary Examiner—Robert J. Spar
Assistant Examiner—Lyle K. Kimms
Attorney, Agent, or Firm—Kolisch, Hartwell & Dickinson

[57] ABSTRACT

A log-transporting conveyor chain is described. The conveyor chain incorporates log-transporting links with attached guide blocks which, in combination with an enclosing chain raceway, prevent undesirable play in the chain.

16 Claims, 1 Drawing Sheet

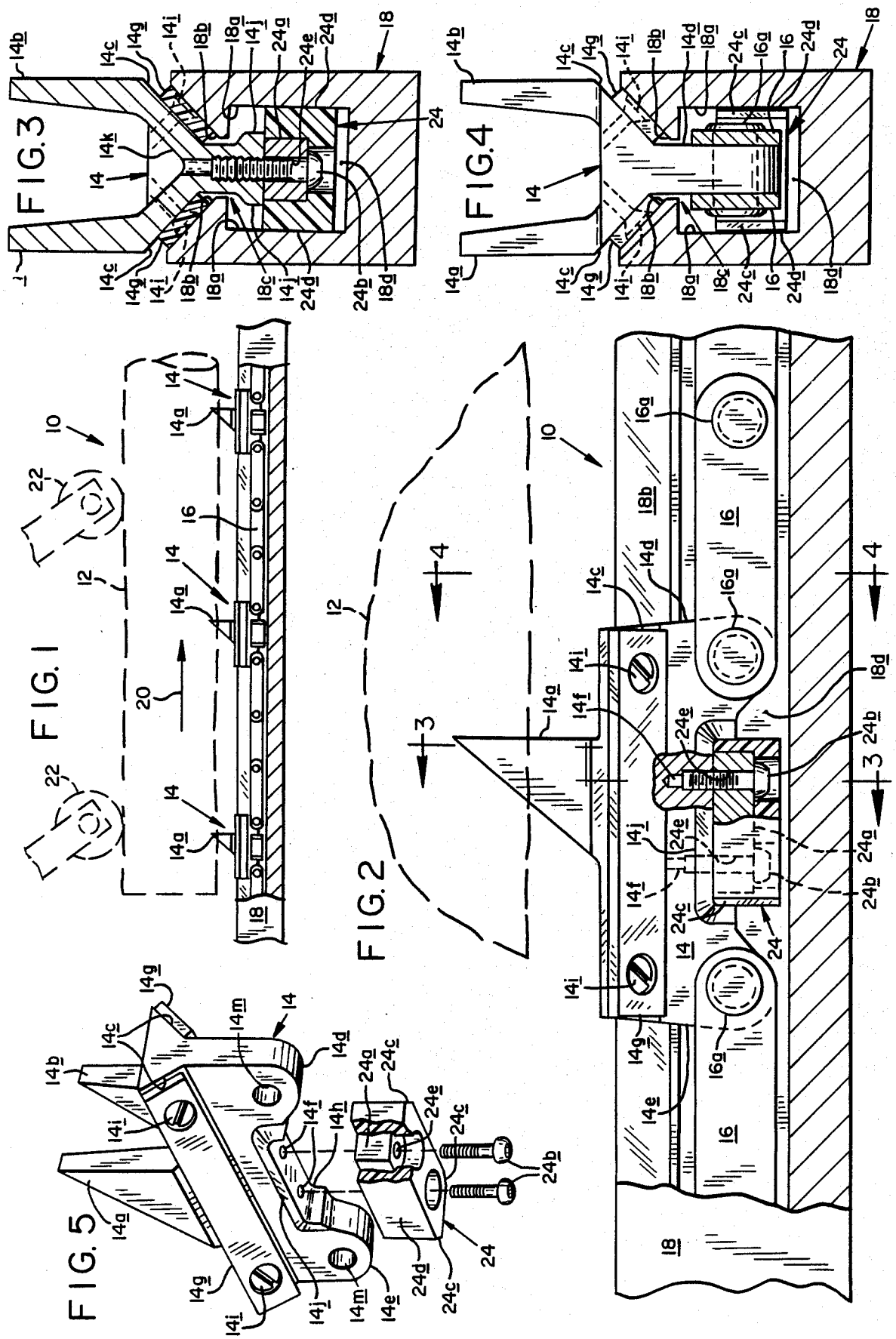

LOG CONVEYOR SYSTEM

This application is a continuation of application Ser. No. 725,303 filed Apr. 19, 1985, now abandoned.

BACKGROUND OF THE INVENTION

This invention pertains to a mechanism for transporting logs in a sawmill along the longitudinal axes of the logs.

A device commonly employed to satisfy longitudinal log transporting requirements is known as a sharp chain. One embodiment of a sharp chain assembly includes an elongate, hollow raceway with an opening, or slot, along its upper length. A continuous-loop drive chain with equally-spaced special log-engaging spiked links is propelled through the raceway by sprocket assemblies at the ends of the raceway. The spiked links have projections which extend upwardly through the raceway slot and impale logs which are guided onto the sharp chain assembly by a lateral feed system. Logs are impacted onto the projections by overhead transverse rollers.

Logs thus engaged are propelled along the conveyor system at the speed of the sharp chain through scanners, chippers, saw mechanisms and the like. Chain links are guided out of the chain raceway and around the drive sprocket at the outfeed end of the assembly, returned to the infeed end, guided around a gear, and returned to the chain raceway. Logs are disengaged from the spiked links and transferred to another device at the outfeed end of the log conveyor system.

One problem with this type of sharp chain conveyor is the tendency for logs to develop tipping or wobbling lateral motion perpendicular to the direction of travel of the conveyor. Such motion is undesirable for several reasons: (1) the spiked links follow the lateral motion and, being the widest part of the sharp chain, can be displaced by these lateral forces sufficiently to make contact with a saw blade while traversing sawing equipment, such contact can severely damage saw blades or the sharp chain and may create a safety hazard to personnel operating the equipment; (2) excessive side-loading leading to premature failure of saw blades could result if the lateral displacement occurred during the sawing phase of the operation; and (3) excessive torque may be exerted on the tie strap links adjacent the displaced spiked link causing chain failures.

Another problem with present enclosed-raceway sharp chain log conveyor systems is debris build-up inside the raceway. This debris may interfere with chain transport and impede lubrication of the chain mechanism.

One prior attempt to avoid these problems was to maintain large tolerances between the sharp chain and the sawing mechanism. This solution avoided the saw blade contact problem but limited the lateral region of potential saw cuts on logs and did not solve the saw blade side loading, chain torque, or debris build-up problems.

Another prior attempt to solve the problems was to utilize a V-shaped track on the top of the chain raceway and spiked links with wear-strip-covered faces conformed to the V-shaped track such that the spiked links were held in the groove by the weight of the log. This method, although partially effective, still permitted some tipping and wobbling of logs.

Yet another previous method of addressing the problem is disclosed in U.S. Pat. No. 3,858,713, issued to Allen in 1975. The Allen patent teaches a precision conveyor chain which is constructed with retaining flanges extending to straddle a chainway. Thus, in the Allen assembly, the inventor has chosen a design in which the chain is external of the guide means. The Allen approach, however effective, would entail a major modification to implement in a log conveyor system having an enclosed chain raceway mechanism.

Accordingly, it is general object of the present invention to provide an internal-raceway log conveyor system in which lateral, tipping motion of the conveyed logs is reduced, thereby stabilizing longitudinal log transport. Specifically, the present invention has the following objects:

(1) to provide a sharp chain lateral stabilizing device adaptable to retrofit existing, enclosed chain raceway systems;

(2) to provide an inexpensive mechanism for stabilizing a sharp chain log conveyor system;

(3) to provide a mechanically-simple method for stabilizing a sharp chain log conveyor system;

(4) to provide a retrofitted sharp chain log conveyor system in which the new components are individually replaceable;

(5) to provide a sharp chain log conveyor system which allows reduced tolerances between the sharp chain and saw blades, thereby increasing the lateral region of potential cuts on logs and maximizing productivity;

(6) to increase safety in a sawmill by reducing the possibility of catastrophic contact between the sharp chain conveyors and saw blades;

(7) to provide a maintenance-free, reliable method for sharp chain lateral stabilization; and (8) to provide a mechanism for cleaning debris from an enclosed chain raceway.

SUMMARY OF THE INVENTION

This invention offers a solution to the problems present in the prior art by providing guide-block-stabilized log-transporting links in a log-transporting conveyor chain designed to be enclosed in a chain raceway.

Log-transporting links, referred to also as spiked links, have projections which extend through a slot in the raceway. Logs are driven onto these projections so as to become impaled by them. Due to this fixed engagement between the transported log and the log-transporting link, tendency of the log to tip or to wobble is coupled to the chain; conversely, lateral stabilization of the spiked links minimizes tipping or wobbling of the logs.

Lateral stabilization of the log-transporting links is afforded by attached guide blocks with antipodal guide surfaces spaced apart to slide within opposing internal guide walls of a chain raceway cavity and dimensioned wider than the widest portion of the conveyor chain assembly.

Longitudinally guiding the log-transporting links such that lateral play is reduced causes these links to absorb lateral forces and thereby to prevent undesirable lateral log motion.

In one embodiment of the invention, the guide block is constructed of lubricant-impregnated polyurethane to reduce friction between the guide block and the raceway guide walls. Preferably, the lubricant-impregnated guide block is formed around a metal insert which has holes for machine-screw-mounting the guide block to a spiked link.

BRIEF DESCRIPTION OF THE DRAWINGS

FIG. 1 is a partial side view of a log conveyor system constructed in accordance with the present invention.

FIG. 2 is an enlarged side view of a spiked link and adjacent tie strap links in a chain raceway.

FIG. 3 is a section of the spiked link taken generally along the line 3—3 in FIG. 2.

FIG. 4 is a section of the spiked link and adjacent tie strap links taken generally along the line 4—4 in FIG. 2.

FIG. 5 is an exploded perspective of a spiked link and guide block.

DETAILED DESCRIPTION OF THE PREFERRED EMBODIMENT

Referring to the drawing, a partial view of a log conveyor system constructed in accordance with the present invention is shown generally at 10.

As a brief overview of the conveyor system, a log 12 is seen to be impaled on projections 14a, 14b of a spiked link 14. Transverse rollers 22 are part of a conventional loading mechanism which positions and secures logs onto conveyor system 10. Rollers 22 provide downward drive to impale log 12 as shown. Spiked link 14 interconnects with tie strap links 16 by means of pins 16a through lug holes 14m. A sharp chain, comprising tie strap links 16 and spiked links 14, is propelled through a chain raceway 18 in the direction of arrow 20 by an appropriate chain drive mechanism (not shown).

Taking a detailed look at the components of the log conveyor system, chain raceway 18 partially houses the sharp chain in an essentially-square-shaped cavity 18d bordered laterally by a pair of guide walls 18a. Opening upwardly from cavity 18d is a slot 18c which is externally bounded by a pair of tracks 18b which form a V-shaped guide for spiked link 14. The ends (not shown) of chain raceway 18 are open to permit exit and re-entrance of the sharp chain. Chain raceway 18 is preferably linear.

As mentioned above, spiked link 14 has two upward log-impaling projections 14a, 14b. Two guide surfaces 14c form a V-shaped region conformed to tracks 18b of chain raceway 18. The guide surfaces 14c have "MICARTA" wear strips 14g attached with screws 14a which are countersunk in the wear strips 14g. Forward lug means 14d and rearward lug means 14e with holes 14m allow interchangeability of spiked link 14 with a tie strap link 16 in the sharp chain.

Referring specifically to FIG. 3, a recessed area 14k (not shown elsewhere) exists, bordered laterally generally by the projections 14a, 14b and longitudinally between screws 14i. Recessed area 14k is provided to reduce the weight of the spiked link 14.

The lower portion of spiked link 14 forms a recess 14h which includes upwardly-extending threaded bores 14f. Recess 14h is flanged with a protuberance 14j on each side. Protuberances 14j, in combination with recess 14h, form a wide mounting surface for a guide block 24.

Guide block 24 is shown detachably attached to the lower portion of spiked link 14 in recess 14h. A pair of screws 24b provide means for attachment through holes 24e. The guide block 24 is formed around a metal insert 24a which provides metal-to-metal contact with recess 14h. Metal insert 24a further provides a metallic surface against which the heads of screws 24b hold. This all-metallic attachment scheme provides greater strength than would an all-polyurethane guide block. Preferably, metal insert 24a is formed of cold-rolled steel.

Guide block 24 is constructed with bevels 24c on four corners. Bevels 24c are primarily provided to facilitate entry of guide block 24 into the mouth (not shown) of chain raceway 18. Having all four corners beveled permits mounting of guide block 24 on spiked link 14 without regard to direction of travel of the spiked link 24.

Guide surfaces 24d are spaced apart and mutually parallel, as shown. Preferably, guide surfaces 24d are dimensioned such that a clearance in the range of approximately 0.005 to 0.01 inches exists between each guide surface 24d and each guide wall 18a when the spiked link 14 and guide block 24 assembly are in operative position in chain raceway 18. This clearance allows the guide block 24 to slide within the cavity 18d but substantially reduces lateral play of the spiked link 14 as it traverses the chain raceway 18.

OPERATION OF THE PREFERRED EMBODIMENT

Looking first to FIG. 1, a log 12 is positioned over the log conveyor system 10 by a feed mechanism (not shown). When log 12 is properly aligned over the spiked links 14, transverse rollers 22 drive log 12 downwardly, impaling it on projections 14a, 14b of spiked links 14. Log 12, thus impaled, is transported along the conveyor system 10 in the direction of arrow 20 by a chain drive mechanism (not shown) which drives links 16.

During operation of log conveyor system 10, as logs are being transported, a lateral wobbling of the logs may develop for any of various reasons. The ability of the log conveyor system 10 to suppress this wobbling is largely determined by the resistance to lateral motion afforded by the spiked links 14 of the system 10.

Referring to FIG. 3 and FIG. 4, spiked link 14 is seen to ride in a V-shaped guide comprising tracks 18b. The conventional V-shape of the spiked link 14 formed by guide surfaces 14c, in combination with the V-shaped receptacle of guide tracks 18b, affords some lateral stability to spiked links 14 when the weight of a log 12 is holding the spiked links 14 firmly in the guide tracks 18b. "MICARTA" wear strips 14g prevent excessive wear to the guide surfaces 14c and the guide tracks 18b.

Without additional stabilizing means, log wobbling and tipping still may occur whenever external forces momentarily unseat spiked links 14 from guide tracks 18b.

Guide block 24, as stated earlier, is rigidly attached to the spiked link 14 with screws 24b. Further, guide surfaces 24d are dimensioned to slide within the lateral bounds of cavity 18d with very little clearance, or play, between the guide walls 18a. This construction virtually prevents lateral motion of the spiked links 14 by providing a rigid longitudinal path of travel for the lower portion of spiked link 14. The planar, parallel feature of the guide walls 18a and the guide surfaces 24d affords a rotational stability as well. Stated another way, should spiked link 14 be bounced or otherwise lifted such that the "MICARTA" wear strips 14g are spaced apart from guide tracks 18b, guide block 24 will continue to maintain a rigid vertical posture of the spiked link 14 by resisting any tendency of the spiked link-guide block assembly to tilt from the vertical plane as defined by the guide walls 18a.

Due to the tremendous forces that may be exerted on guide block 24 in log transporting operations, the guide block 24 is constructed with a metal insert 24a against which screws 24b hold.

Also, since the spiked link 14 may develop some lateral wobble prior to entry into the mouth (not shown) of the chain raceway 18, guide block 24 is constructed with bevels 24c which serve to channel the guide block 24 into the cavity 18d.

Guide block 24 further serves as a cavity 18d cleaning mechanism by pushing particles of debris which may enter cavity 18d via slot 18c through the cavity 18d and out the outfeed end (not shown) of chain raceway 18.

Should replacement of the guide block 24 become necessary, simple removal of two screws 24b permits disassembly of the guide block 24 from the spiked link 14 and replacement is readily accomplished.

A single preferred embodiment of the invention has been described herein. Changes and modifications apparent to those skilled in the art can be made without departing from the spirit and scope of the invention and, accordingly, are intended to be subsumed by the following claims.

It is claimed and desired to secure by Letters Patent:

1. A log-transporting conveyor chain for use within a chain raceway having an upwardly facing surface for providing vertical support to said chain, and a lower portion for providing lateral support and alignment to said chain, comprising:
    a log-transporting link having an upper portion with vertical load support means for conveying vertical load to the upwardly-facing surface of the raceway, and a downwardly extending portion which extends into the lower portion of the raceway, wherein said link includes first lug means and second lug means disposed within the lower portion of the raceway;
    interconnecting links forming a chain disposed about a path of conveyance including a first pair of opposed tie strap links connecting to said first lug means and a second pair of opposed tie strap links connecting to said second lug means for travel within the lower portion of the raceway; and
    a guide block secured to said log-transporting link intermediate said first lug means and said second lug means, said guide block having opposing guide surfaces disposed transversely with respect to the path of conveyance and transversely spaced apart a greater distance than the width of said interconnecting links for aligning said chain as it travels through the raceway.

2. The conveyor chain of claim 1, wherein said guide block is formed of a plastic material.

3. The conveyor chain of claim 1, wherein said guide block is formed of lubricant-impregnated polyurethane.

4. The conveyor chain of claim 1, wherein said guide block includes and at least partially encompasses a metallic insert.

5. The conveyor chain of claim 1, wherein said log-transporting link defines a recess into which said guide block is mounted.

6. The conveyor chain of claim 1, wherein said guide block is secured to said log-transporting link with screw means.

7. The conveyor chain of claim 1, wherein said guide surfaces are substantially planar and mutually parallel.

8. The apparatus of claim 1, further comprising a chain raceway having an upwardly facing surface for providing vertical support to said chain, and a lower portion for providing lateral support and alignment to said chain.

9. A sharp-chain-type log conveyor system comprising:
    an elongate chain raceway including an outside surface, an inside surface having a pair of opposing shoulders which define a cavity disposed about a longitudinal axis, said cavity having two substantially-opposing guide walls extending along the longitudinal axis, said raceway defining a slot communicating with said cavity and extending generally parallel to the longitudinal axis between said opposing shoulders;
    a sharp chain having a multiplicity of interconnected links extending along the longitudinal axis, at least one of said links being a spiked link, said spiked link including an upwardly extending spike and an underside;
    a guide block disposed within said raceway and having two substantially opposing guide surfaces in longitudinal slidable contact with said guide walls, and including means for mounting said guide block adjacent said underside of said spiked link, whereby said guide block guides the travel of said sharp chain from within said chain raceway; and
    wherein said underside of said spiked link defines a downwardly facing recess, and said guide block is mounted to said spiked link within said spiked link recess.

10. A log-transporting link, for connection to tie links in a log-transporting conveyor chain which travels in a raceway, comprising:
    a track-guided upper portion having means for engagement of a log;
    a lower portion having forward lug means and rearward lug means for connection to the conveyor chain tie links, said lower portion defining an upward recess intermediate said forward lug means and said rearward lug means; and
    a guide block formed of friction-reducing material removably mounted within said recess, and including two opposing lateral guide surfaces transversely spaced apart a greater distance than the width of said lower portion to guide the log-transporting link as it travels through the raceway.

11. The log-transporting link of claim 10, wherein said guide block is formed of plastic material.

12. The log-transporting link of claim 10, wherein said guide block is formed of lubricant-impregnated polyurethane.

13. The log-transporting link of claim 10, wherein said guide block includes a rigid insert.

14. The log-transporting link of claim 10, wherein said guide surfaces are flat and mutually parallel.

15. A sharp-chain-type log conveyor system comprising:
    an elongate chain raceway including an outside surface, an inside surface defining a cavity disposed about a longitudinal axis, said cavity having two flat, mutually parallel, opposing guide walls extending along the longitudinal axis, said raceway defining a slot communicating with said cavity and extending generally parallel to the longitudinal axis and further defining two elongate, flat surfaces, adjacent said slot, forming a generally V-shaped track;

a sharp chain, including a multiplicity of interconnected links and a plurality of equally-spaced spiked links extending along the longitudinal axis, each said spiked link having an upper portion extending externally of said raceway through said slot and including two wear-strip-covered surfaces mated to said V-shaped track, spike means for engaging a log fixedly attached to said upper portion, and a lower portion disposed in said cavity, having forward lug means and rearward lug means, defining a downwardly extending recess intermediate said forward lug means and said rearward lug means; and each said spiked link further having a substantially solid-rectangular-block-shaped, lubricant-impregnated, polyurethane guide block formed around a metallic insert mounted within said recess of said spiked link, said guide block including two flat, mutually parallel antipodal guide surfaces in longitudinal slidable contact with said guide walls, each said guide surface having a clearance of approximately 0.005 to 0.01 inches between each said guide wall.

16. A log-transporting conveyor chain for use within a chain raceway, comprising:

a log-transporting link having first lug means and second lug means, and defining a recess intermediate said first and second lug means;

interconnecting links forming a chain disposed about a path of conveyance including a first pair of opposed tie strap links connecting to said first lug means and a second pair of opposed tie strap links connecting to said second lug means; and a guide block secured to said log-transporting link intermediate said first lug means and said second lug means, and to be disposed within said recess and within the raceway, said guide block having opposing guide surfaces disposed transversely with respect to the path of conveyance and transversely spaced apart a greater distance than the width of said interconnecting links, for guiding said log-transporting link as it travels through the raceway.

* * * * *